United States Patent
Koch et al.

(12) 
(10) Patent No.: US 6,656,290 B1
(45) Date of Patent: Dec. 2, 2003

(54) SOLDERING PASTE FOR HARD-SOLDERING AND COATING ALUMINUM AND ALUMINUM ALLOYS

(75) Inventors: Jürgen Koch, Mühlheim (DE); Leander Staab, Mömbris (DE); Wolfgang Kohlweiler, Frankfurt (DE); Karl-Anton Starz, Rodenbach (DE)

(73) Assignee: Degussa Aktiengesellschaft, Frankfurt am Main (DE)

( * ) Notice: Subject to any disclaimer, the term of this patent is extended or adjusted under 35 U.S.C. 154(b) by 705 days.

(21) Appl. No.: 09/115,553

(22) Filed: Jul. 15, 1998

(30) Foreign Application Priority Data

Jul. 21, 1997 (DE) .......................................... 197 31 151

(51) Int. Cl.$^7$ ........................ B23K 35/34; B23K 35/02; B22F 1/00; B32B 15/10

(52) U.S. Cl. ........................ 148/24; 228/248.1; 228/224; 419/36; 419/65; 428/654

(58) Field of Search ........................ 428/654; 228/248.1, 228/224, 183; 420/548; 148/24; 106/404; 419/65, 36

(56) References Cited

U.S. PATENT DOCUMENTS

| 2,522,937 A | | 9/1950 | Forker ........................ 148/23 |
| 5,173,126 A | * | 12/1992 | Ogura et al. ................... 148/23 |
| 5,226,974 A | * | 7/1993 | Conn ........................... 148/23 |
| 5,690,890 A | * | 11/1997 | Kawashima et al. ......... 420/559 |
| 5,878,943 A | * | 3/1999 | Nishikawa et al. ......... 228/205 |

FOREIGN PATENT DOCUMENTS

| CZ | 329824 | 6/1958 |
| DE | 2452996 | 10/1980 |
| DE | 3800050 | 7/1988 |
| DE | 3923829 | 1/1991 |
| DE | 4239829 | 6/1993 |
| EP | 0512489 A2 | 11/1992 |
| EP | 0556864 A1 | 8/1993 |
| WO | 90/13393 | 11/1990 |
| WO | 97-03788 A1 | 2/1997 |

OTHER PUBLICATIONS

Soviet Union 1127728 in Derwent Abstract 85–151572/25, Jul. 12, 1984.

* cited by examiner

*Primary Examiner*—Paul Thibodeau
*Assistant Examiner*—Kevin R Kruer
(74) *Attorney, Agent, or Firm*—Kalow & Springut LLP

(57) ABSTRACT

A soldering paste for hard-soldering and coating working parts made of aluminum or aluminum alloys, which contains 25 to 35 percent in weight of a water-miscible organic binding agent on the basis of aliphatic glycols, 25 to 45 percent in weight of an aluminum hard-soldering powder, 25 to 45 percent in weight of an aluminum fluxing agent and, as an additive to influence the rheological properties, 0.01 to 0.2 percent by weight with respect to the total amount of one or several fatty acids with 10 to 20 C atoms and/or their ammonium salts.

16 Claims, No Drawings

SOLDERING PASTE FOR HARD-SOLDERING AND COATING ALUMINUM AND ALUMINUM ALLOYS

INTRODUCTION AND BACKGROUND

The present invention relates to a hard-soldering paste for bonding together and/or coating working parts made of aluminum or aluminum alloys.

In the sate of technology today, in addition to the techniques of welding, more and more often, hard-soldering processes are used to bond work pieces made of aluminum or aluminum alloys. In this regard the work pieces are soldered together so they are mechanically secure and interlocking by heating metallic soldering materials and with the use of fluxing agents, which can be in solution, suspension, or paste form.

In order to be able to solder together parts made of aluminum or aluminum alloys, soldering alloys are required that have a lower melting point than that of the parts that are to be bonded together. Usually aluminum alloys with additives that impart low melting points such as silicon, copper, or zinc are used in this connection.

The fluxing agents have the task of providing a good moistening effect during the soldering process by dispersing the troublesome oxide layers on the parts and soldering materials. Mixtures of fluorides and chlorides of alkali metals and alkaline earth metals or complex alkali aluminum fluorides are usually used as fluxing agents for soldering aluminum.

During furnace brazing, it is advantageous to use fluxing agents containing complex alkali aluminum fluorides because they are not corrosive. However, with these fluxing agents additional cost-intensive cleaning procedures are needed to remove the fluxing agent and its reaction products from the surface of the parts after the soldering process.

To simplify the production process, particularly in mass production of a large number of pieces, hard-soldering pastes that consist of a prefabricated mixture of solder powder, fluxing agent, and binding agent are currently preferred for soldering aluminum. The parts to be bonded together are coated with the hard-soldering paste and then, for example, soldered together in a tunnel kiln. The soldering operation can be carried out in air. However, in order to avoid oxidation of the parts and the soldering powder, the soldering process often is carried out in a protective gas atmosphere, as for example, nitrogen/hydrogen.

In addition to the two component parts, namely, the soldering powder and the fluxing agent, an organic binding agent has great significance with respect to storage performance, its ability to be metered or dispensed, and the application of the soldering paste. The organic binding agent primarily has the task of holding the soldering and fluxing agent powders in suspension in a finely divided form so that the cementing of the dispersed particles cannot take place and a problem-free dispensing thereof is possible even after a lengthy storage time. Moreover, the rheological properties of the binding agent must be coordinated in such a way that the portions of dispensed paste needed for the job, referred to herein as depots, do not run during the drying and heating phase. Usually the binding agent in the soldering paste consists of a solution of various polymers in an organic solvent. Depending on the conditions for use and soldering, usually cellulose derivatives, hydroxypropyl cellulose, or polymethacrylate in heavy hydrocarbons, alcohols, glycols, or polyalkylene glycols are used.

At present, extremely high demands are made on these hard-soldering pastes in automated mass production systems.

The application of the soldering pastes is carried out via an automated metering or dispensing system in most cases. In so doing, one must find a way that during storage and dispensing of the paste, a separation into the individual components does not take place and the viscosity remains constant over a long period of time.

After dispensing the soldering paste the work piece goes through a zone of preparatory heating in the oven during which the soldering paste dries. In this initial phase of the soldering process it is necessary that the paste remains on the desired site. That is, it should not run off the component part while being heated due to the lowered viscosity. Particularly when depositing the paste on vertical surfaces a shortage of solder can occur at the solder surface because of runny soldering paste, which leads to defective soldering and thus an increase in the portion of rejects.

Furthermore, one must be able to achieve a system so that the binding-agent system of the soldering paste is completely vaporized or burned out before ever reaching the soldering temperature so that the effectiveness of the fluxing agent is not impaired and the soldering flux is not hindered. Due to optical and technical testing concerns it is also desirable that after the soldering process is completed no black residue remains on the soldering site, which impairs the visual inspection of the soldering connection.

In addition, for economic and ecological reasons it is desirable that the hard-soldering paste be water soluble so the barrel and metering device can be cleaned with water. Expensive and less environmentally compatible organic solvents that cannot be mixed with water should be avoided in production.

In EP 0 512 489 an aluminum hard-soldering paste is described whose binding agent consists of a liquid polyisobutylene polymer. The binding agents of these pastes do not, however, display thixotropic behavior so the metered paste deposit runs off the component part before the actual soldering process takes place. Moreover, these soldering pastes cannot be thinned with water and washed away.

EP 0 475 956 describes a soldering paste for hard-soldering aluminum the binding agent of which consists of a very pure monopropylene glycol without higher molecular proportions. This solvent is very expensive because it is very pure. In addition, the soldering pastes prepared from such binding agents do not display any thixotropic behavior and this results in the paste separating into its component parts while in storage because the soldering powder precipitates.

It is an object of the present invention to avoid the problems of the prior known solder paste formulations used in the hard-soldering of aluminum and aluminum alloys.

Another object of the present invention is to be able to solder parts made of aluminum and/or aluminum alloys by using automatic solder paste metering devices while avoiding run off during the final heating process, and without leaving behind any black decomposition products from the binding agent after the soldering process is completed.

Still a further object of the present invention is to develop a water-miscible, hard-soldering paste for the soldering of parts of aluminum and/or aluminum alloys that is storage stable and adapted for use in the soldering processes described therein.

SUMMARY OF THE INVENTION

The above and other objects of the invention can be achieved by an aluminum hard-soldering paste that contains 25 to 35 percent by weight of a water-miscible organic binding agent on the basis of aliphatic glycols, 25 to 45 percent by weight of an aluminum hard-solder, and 25 to 45 percent by weight of an aluminum fluxing agent, and as an additive to influence the rheological properties 0.01 to 0.2 percent by weight (with respect to the total weight) of at least one fatty acid containing 10 to 20 C atoms and/or an ammonium salt thereof.

A feature of the present invention is, furthermore, the use of one or more fatty acids, each acid having 10 to 20 C atoms and/or their ammonium salts in a proportion of 0.01 to 0.2 percent in weight based on the total weight of the solder paste to influence the rheological properties thereof and, in particular, to raise the thixotropy and/or structural viscosity of such water-miscible, aluminum hard-soldering pastes.

DETAILED DESCRIPTION OF THE INVENTION

In the soldering paste according to the present invention all types of aluminum hard-solders that have a lower melting temperature than the base metals to be joined or coated can be used as a hard-soldering powder for coating and joining aluminum and aluminum alloys. These materials are well known in the art. For example, the pure binary aluminum silicon hard-solders Al—Si 5–12% are included among this group, as well as the low-melting ternary systems such as Al—Si 5–12% with additives of Cu, Mg, or Zn. The average particle size of the aluminum hard-soldering powder used is between. 10 $\mu$m and 500 $\mu$m. Preferably, soldering powders with a particle distribution of 50 to 150 $\mu$m are used because, on the one hand, powder particles that are too coarse can easily clog up the metering device and tend to precipitate out and, on the other hand, powders with a high proportion of fine particles usually worsen the soldering result because of the increased oxide content caused by the larger surface area. To obtain a reliable, secure connection, it is therefore desirable that the oxide content of the hard-soldering powder be less than 0.2%, and preferably less than 0.1%. The content of the soldering powder in the soldering paste according to the invention is 25 to 45 percent by weight, preferably 30 to 40 percent by weight, with respect to the total amount.

The effective temperature of the fluxing agents used in the soldering paste according to the invention is coordinated with the working temperatures of the hard-solders used. Typical fluxing agents are, for instance, noncorrosive, water-insoluble salts or salt mixtures of complex alkali aluminum fluorides such as $KAlF_4$, $KAlF_4$ with $K_2AlF_5$, and KAlF4 with $K_3AlF_6$ having effective temperatures of 580° and higher. The choice of the fluxing agent is, however, not necessarily limited to this class of compounds. Mixtures of $AlF_3$ and KF or cesium aluminum fluoride can also be used. The amount of the fluxing agent required is generally geared toward the contents of solder in the pastes. Usually the fluxing agent concentration in the solder paste is 25 to 45%, preferably 30 to 40%, with respect to the total amount of the paste.

The aluminum hard-soldering pastes according to the invention contain organic solvents that are essentially water miscible and can be mixed with water as the binding agent. The best results-are obtained with aliphatic glycols such as, for example, ethylene glycol, propylene glycol, diethylene glycol, trimethylene glycol, dipropylene glycol, and hexylene glycol, or mixtures of these solvents. They are thus water-miscible and to this extent more compatible with the environment. The proportions of such water miscible binding agents in the solder paste is 25 to 35 percent by weight, preferably 27 to 30 percent by weight, with respect to the total amount of the solder paste.

Surprisingly, it was shown that by adding small amounts of higher molecular weight saturated carboxylic acids or their ammonia salts as an additive to an aluminum hard-soldering paste consisting of soldering powder, fluxing agent, and a binding agent made of aliphatic glycols, the rheological properties of the soldering paste can be varied in a wide range. The water-miscible, aluminum hard-soldering paste according to the present invention contains (with respect to the total amount) 0.01 to 0.2 percent by weight of one or more fatty acids wherein the fatty acid contains 10 to 20 C atoms and/or their ammonium salts. Even such small amounts as 0.01 percent by weight cause a clear increase in the thixotropy and structural viscosity. The original Newtonian flow of the soldering paste changes to pseudoplastic behavior after the additives have been worked in. After adding 0.15%, the soldering paste does not flow on its own anymore in spite of the low viscosity. When 0.2 percent by weight is exceeded, the rheological properties no longer conform to practice. The thickening effect occurs only with higher molecular weight, saturated carboxylic acids with 10 to 20 C atoms and their ammonium salts, and it is more pronounced with increasing length of the aliphatic nonpolar alkyl radical of the carboxylic acid. It is noteworthy that the carboxylic acids with less than 10 carbon atoms do not display this thixotropic effect. The monovalent and multi-valent metal salts of these acids (e.g., potassium palmitate, aluminum stearate, magnesium stearate, etc.) cannot be used because they do not have thixotropic effects or leave behind corrosive residues and disturb the soldering process. Fatty acids with more than 20 C atoms influence the rheological properties in a way that does not conform to practice. Very good results are obtained with the monocarboxylic acids; namely, lauric acid, myristic acid, palmitic acid, and stearic acid, or their ammonium salts. The hard-soldering pastes with these additives have a stable viscosity and do not display any cementation of the fluxing agent powder and soldering powder during storage for more than three months. They can thus be dispensed easily and consistently with automatic dispensing devices. Surprisingly, the metered or dispensed paste depots do not run while drying and heating—even on vertical surfaces—and melt at soldering temperature without forming troublesome organic decomposition products.

To produce the hard-soldering pastes according to the invention the fluxing agent in powder form is first stirred into the glycol binding agent with the usual dispersing apparatuses and, after completely homogenizing, is mixed with 0.01–0.2 percent by weight (preferably 0.02–0.1 percent by weight) of the amount of the additive necessary to obtain the desired structural viscosity. Finally, the corresponding amount of aluminum hard-soldering powder is put in the finished binding agent. Then the soldering paste is ready for use and can be filled in a container. The following examples will illustrate the invention in greater detail.

EXAMPLE 1

Composition of the Paste

| | |
|---|---|
| 272.10 kg | hexylene glycol |
| 332.70 kg | fluxing agent on a basis of $KAlF_4$ (AluBraze F 32/80) |

| | -continued |
|---|---|
| 394.40 kg | soldering powder AlSi 88/12, particle size <150 μm |
| 0.80 kg | ammonium stearate |
| 1000.00 kg | |

The solvent is mixed successively with the fluxing agent and the additive with a blade stirrer at room temperature and then is intensively stirred for 30 minutes. After adding the aluminum hard-soldering powder in portions, the premix is cooled by cooling slowly at room temperature. The finished soldering paste has a viscosity of 450–500 dPa·s at 25° C.

A T-joint soldering is carried out under pure nitrogen with this paste. For this purpose the paste is applied with an automatic apportioning device (Dosimat 1000 DVE of the GLT firm, 1.5 bar, 2-mm needle diameter) on the upper sheet of the T-joint and heated inductively. During the drying and heating phases the soldering paste does not run off the component part. Only after the melting point of the solder/fluxing agent mixture is reached does the paste depot melt without forming troublesome decomposition products and completely fill in the soldering gap between the two aluminum sheets.

EXAMPLE 2

| 249.40 kg | dipropylene glycol |
|---|---|
| 24.30 kg | hexylene glycol |
| 394.70 kg | fluxing agent on the basis of KAlF$_4$ (Degussa bx) |
| 331.20 kg | soldering powder AlSi 90/10, particle size <90 μm |
| 0.30 kg | palmitic acid |
| 1000.00 kg | |

The solvents are mixed and the fluxing agent and soldering powder stirred in with a dissolver one after another with the palmitic acid.

The end viscosity of the aluminum hard-soldering paste at room temperature is 150–200 dPa·s. Despite this low viscosity the soldering paste does not precipitate even after being in storage for three months and has an excellent structural viscosity.

The soldering paste is put in a screen printer (21 T, 150 μm mesh size) in a wet layer with a thickness of 100 μm on an aluminum sheet, dried, and then melted in a protective-gas tunnel kiln under nitrogen. After the soldering process a hard-soldering layer, on average 35 μm thick, is formed on the aluminum sheet.

Further variations and modifications of the invention will be apparent to those skilled in the art from the foregoing and are intended to be encompassed by the claims appended hereto. German priority application 197 31 151.2 is relied on and incorporated by reference herein.

We claim:

1. A soldering paste for hard-soldering and coating parts made of aluminum, aluminum alloys or combinations thereof, said paste containing 25 to 35 percent by weight of a water-miscible organic binding agent composed of an aliphatic glycol, 25 to 45 percent by weight of an aluminum hard-soldering powder, 25 to 45 percent by weight of aluminum fluxing agent, and an additive which is a member selected from the group consisting of one or more fatty acids with 10 to 20 C atoms, an ammonium salt of said one or more fatty acids and mixtures of one or more fatty acids and ammonium salts, in an amount of 0.01 to 0.2 percent by weight with respect to the total weight of the paste.

2. The soldering paste according to claim 1, which contains 0.02 to 0.1 percent by weight, with respect to total weight, of said additives.

3. The soldering past according to claim 1, wherein said additive is selected from the group consisting of lauric acid, myristic acid, palmitic acid, stearic acid; ammonium salts of lauric acid, myristic acid, palmitic acid, or stearic acid; and mixtures thereof.

4. The soldering paste according to claim 1 wherein the water-miscible organic binding agent is selected from the group consisting of ethylene glycol, propylene glycol, diethylene glycol, trimethylene glycol, dipropylene glycol, hexene glycol and mixtures thereof.

5. The soldering paste according to claim 1 wherein the binding agent present in an amount of 27 to 30 percent by weight with respect to the total weight.

6. The soldering paste according to claim 1 wherein the aluminum hard-soldering powder is present an amount of 30 to 40 percent by weight.

7. The soldering paste according to claim 1 wherein the aluminum hard-soldering powder has an oxide content of less than 0.2 percent by weight.

8. The soldering paste according to claim 1, wherein said aluminum fluxing agent is a complex alkali aluminum fluoride.

9. The soldering paste according to claim 1 wherein the aluminum fluxing agent is present in an amount of 30 to 40 percent by weight with respect to the total amount.

10. A plurality of parts made of aluminum, an aluminum alloy or combination thereof having been bonded together with the paste of claim 1.

11. The soldering paste according to claim 1 wherein the aluminum hard-soldering powder is an Al—Si binary alloy with 5–12 weight percent Si.

12. The soldering paste according to claim 11 wherein the aluminum hard-soldering powder has a particle size between 10 and 500 μm.

13. The soldering paste according to claim 11 wherein the aluminum hard-soldering powder has a particle size between 50 and 150 μm.

14. A method of forming a hard soldering layer on a sheet made of aluminum, an aluminum alloy or combination thereof with a soldering paste comprising placing the soldering paste of claim 1 onto said sheet, thereafter melting said paste at a sufficiently elevated temperature to form the desired hard-soldering layer on said sheet.

15. A method of hard soldering a plurality of parts made of aluminum, an aluminum alloy, or combination thereof with a soldering paste comprising applying the soldering paste of claim 1 to at least one of said parts, and bring at least one of said paste into contact with another of said plurality of parts, so that said parts is in contact with both of said parts, heating said paste to a sufficiently elevated temperature to melt said paste and holding said parts in contact while cooling to form a bond between said parts.

16. A method to influence the rheological properties of a soldering paste that is used for hard-soldering and coating parts made of aluminum or aluminum alloys comprising forming a composition that contains an aluminum hard-soldering powder in a water-miscible organic binding agent and an aluminum fluxing agent, and a fatty acid with 10 to 20 C atoms an ammonium salts thereof, or mixture thereof in a proportion of 0.01 to 0.2 percent by weight with respect to the total weight for raising the thixotropy and/or structural viscosity of said paste.

* * * * *